United States Patent [19]

Kanzaki

[11] Patent Number: 5,614,978
[45] Date of Patent: Mar. 25, 1997

[54] CAMERA SHUTTER CONTROL DEVICE AND METHOD

[75] Inventor: Masatoshi Kanzaki, Kanagawa-ken, Japan

[73] Assignee: Nikon Corporation, Tokyo, Japan

[21] Appl. No.: 523,142

[22] Filed: Sep. 5, 1995

[30] Foreign Application Priority Data

Nov. 2, 1994 [JP] Japan .................................. 6-269614

[51] Int. Cl.$^6$ ...................................................... G03B 9/08
[52] U.S. Cl. ........................... 396/463; 396/273; 396/480
[58] Field of Search ................................ 354/234.1, 435, 354/431

[56] References Cited

U.S. PATENT DOCUMENTS

| | | | |
|---|---|---|---|
| 4,325,614 | 4/1982 | Grimes | 354/23 D |
| 4,448,506 | 5/1984 | Saegusa et al. | 354/431 |
| 4,453,811 | 6/1984 | Yamasaki | 354/412 |
| 4,716,432 | 12/1987 | Stephany | 354/435 |
| 5,245,380 | 9/1993 | Yang | 354/435 |
| 5,257,056 | 10/1993 | Kazumi | 354/234.1 |

Primary Examiner—Safet Metjahic
Assistant Examiner—Christopher E. Mahoney
Attorney, Agent, or Firm—Oliff & Berridge

[57] ABSTRACT

A camera shutter control device includes a controller for controlling the camera, a shutter device having front and rear curtains, and shutter drives for driving the curtains. A computation device determines the shutter time and a correction device corrects the shutter time based on correction values stored in a memory. The shutter curtains are continuously controlled by the controller based on a corrected shutter time, wherein the corrected shutter time can have either a positive, negative, or zero value.

18 Claims, 8 Drawing Sheets

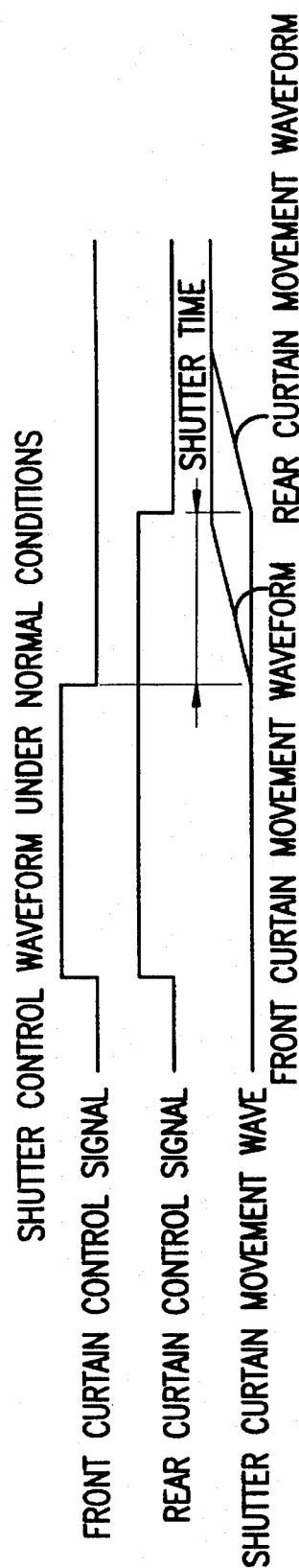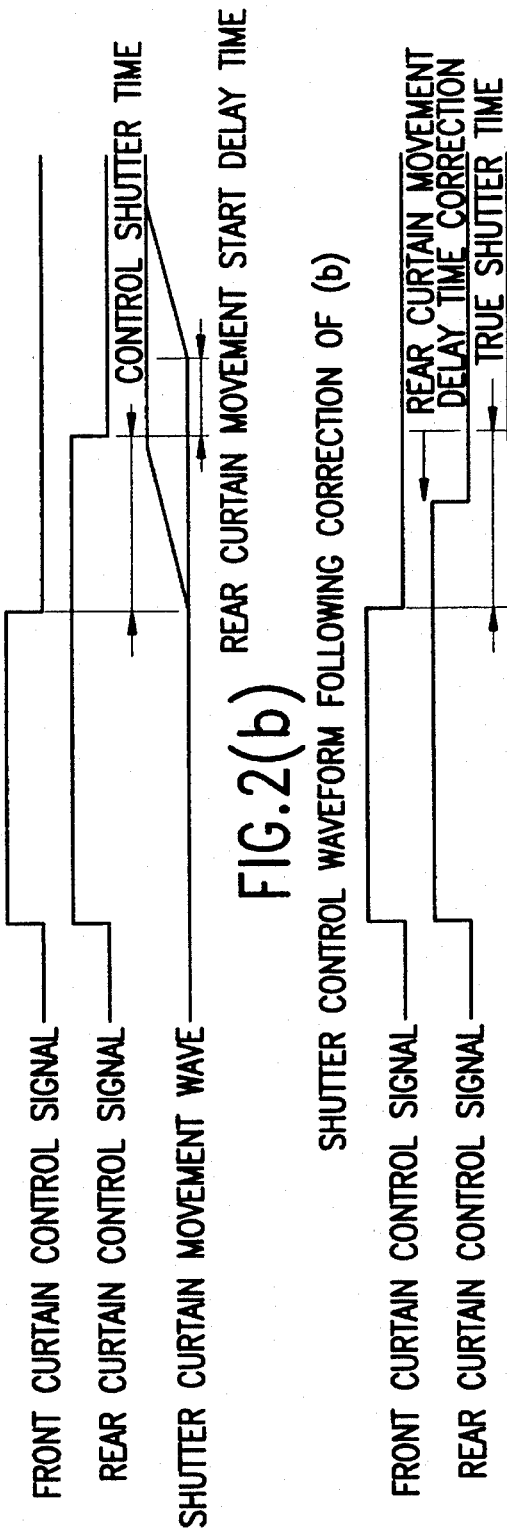

SHUTTER CONTROL WAVEFORM PRIOR TO CORRECTION WHEN REAR CURTAIN IS DELAYED BY MORE THAN THE CONTROL SHUTTER TIME

SHUTTER CONTROL WAVEFORM FOLLOWING CORRECTION OF (c)

CAMERA SHUTTER CONTROL DEVICE AND METHOD

BACKGROUND

1. Field of the Invention

The present invention relates to a shutter control device and method for a camera.

2. Background of Related Art

Various shutter devices for cameras are known. One such device is a vertical movement type of focal plane shutter which includes front and rear curtains. Control of this type of shutter device is accomplished by causing the rear curtain to move with a predetermined time delay (i.e. a corrected shutter time) following the movement of the front curtain.

The corrected shutter time is obtained by adding a correction value to a determined shutter time. The determined shutter time is based on the set aperture amount, which is created between the two curtains, and the aperture time length (i.e. shutter speed). The correction value depends on the actual shutter action conditions and corresponds to an amount of time that the start movement of the rear curtain is shifted with respect to the front curtain. The correction values are stored in a memory. Correction is accomplished by causing the rear curtain to move at the corrected shutter time following movement of the front curtain. Specifically, the corrected shutter time is measured from the time the front curtain is moved to the open position.

However, with the above-described shutter control device, a problem arises when the shutter control is used with a shutter device having poor precision. Specifically, when there is a relatively long delay between either of the front or rear curtain control signals and actual movement of the respective curtain, the shutter curtains will not actually open for the appropriate shutter time, or even worse, they will not open at all. This problem is particularly significant as shutter speeds increase. Consequently, exposure of the film being is adversely affected.

SUMMARY OF THE INVENTION

In consideration of the foregoing problems, it is an object of the present invention to provide a camera shutter control device that can produce accurate shutter operation even at high shutter speeds with shutters having poor precision.

In order to meet this and other objects of the invention, the camera shutter control device according to an embodiment of the present invention includes a shutter device for exposing the film within a camera and a shutter drive connected to the shutter device. A determination device determines a shutter time for the shutter device, and a memory device stores at least one correction value. A control device is provided and includes a correction device that corrects the shutter time determined by the determination device based on the correction value stored in the memory device. The control device controls the operation of the shutter drive based on the shutter time corrected by the correction device. The control device further conducts a first control operation of the shutter drive when the corrected shutter time has a positive value and a second control operation when the corrected shutter time has a negative value.

With the present invention, even if the delay in the actual movement of a shutter curtain exceeds a determined shutter time, accurate shutter control can still be accomplished.

BRIEF DESCRIPTION OF THE DRAWINGS

This invention will be described in detail with reference to the following drawings in which like reference numerals refer to like elements and wherein:

FIGS. 2(a)–(c) are timing charts showing the action timing under various conditions of the shutter device;

DETAILED DESCRIPTION OF A PREFERRED EMBODIMENT

Figure 1:
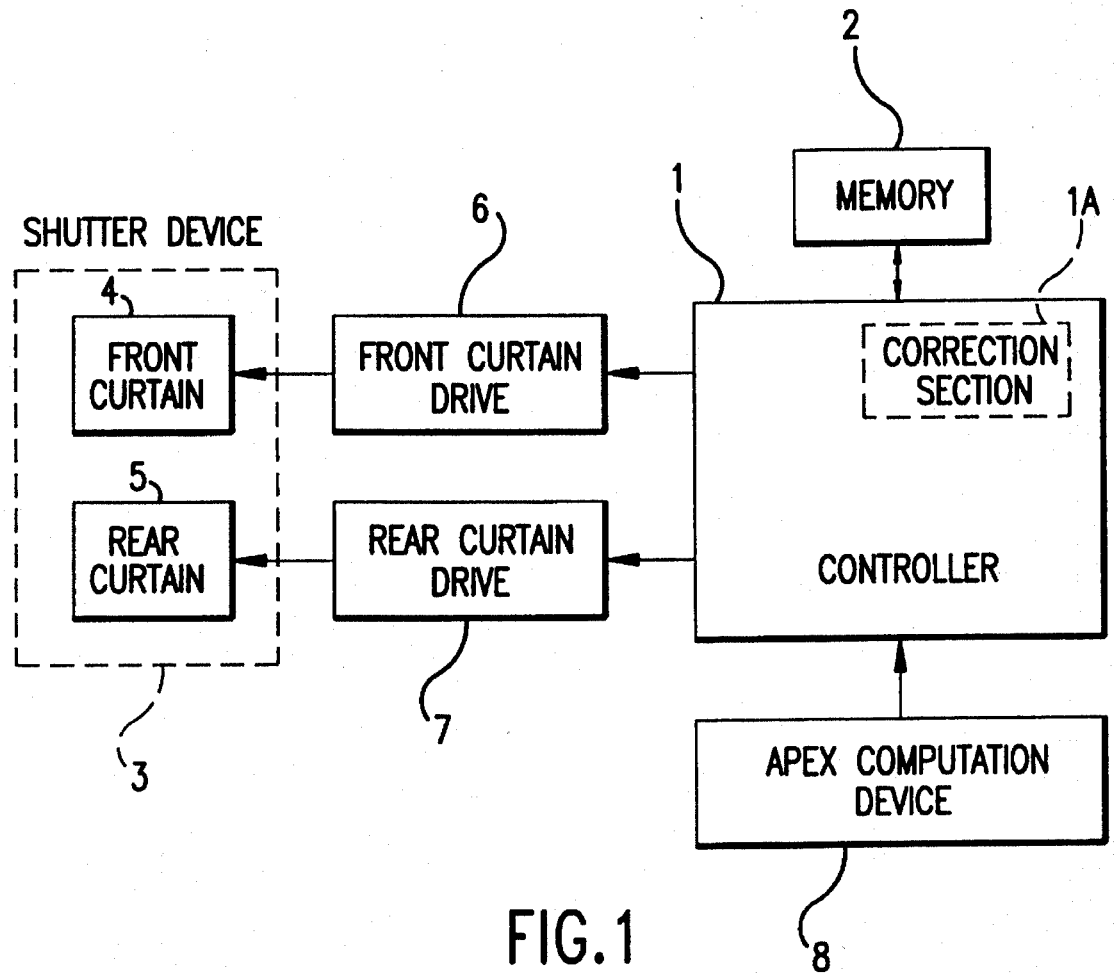
FIG. 1 is a block diagram of a camera shutter control device according to an embodiment of the present invention.

FIG. 1 is a block drawing showing an embodiment of a camera shutter control device according to the present invention.

A controller 1 controls the various actions of a camera (not shown). A memory 2 stores shutter time correction values therein. A shutter device 3 controls the exposure of the film and includes a front curtain 4 and a rear curtain 5 driven by a front curtain drive 6 and a rear curtain drive 7, respectively.

The controller 1 determines the aperture time interval (i.e. a corrected shutter time) of the shutter device 3 by adding a shutter time obtained from an apex computation device 8 with a correction value obtained from the memory 2. The apex computation device 8 computes the shutter time based on a photometry value obtained from a photometry device (not shown) or outputs a manually set shutter time. The controller 1 is provided with a correction section 1a that corrects the shutter time obtained from the apex computation device 8 by adding thereto a correction value obtained from the memory 2.

With the above arrangement, the present invention conducts control of the shutter device 3, and more specifically, control of the driving of the front curtain 4 and rear curtain 5 based on the corrected shutter time. The shutter control device according to the present invention can accurately control low precision shutter devices even when high shutter speeds are used. This is because the disclosed shutter control device can continuously control the shutter device even when the corrected shutter control time has a negative value (to be described below).

Actions of the camera other than those described above are conventional, and the description herein will be limited to the actions of the shutter control device that relate to the present invention.

FIGS. 2(a)–(c) and 3(a)–(d) are timing charts of the shutter control according to an embodiment of the present invention.

FIG. 2(a) is an ideal control waveform for shutter device. Opening of the respective shutter curtains (i.e., front curtain 4 and rear curtain 5) occurs when the respective control signals are received.

FIG. 2(b) shows a control waveform for a typical shutter device. When the rear curtain 5 is driven by a rear curtain control signal, there is a delay before the rear curtain 5 actually begins to move. In order to correct for this delay, it is possible to obtain, such as is shown in FIG. 2(c), the appropriate shutter time by emitting the rear curtain control signal earlier by an amount of time equalling the delay time.

Figure 3A:
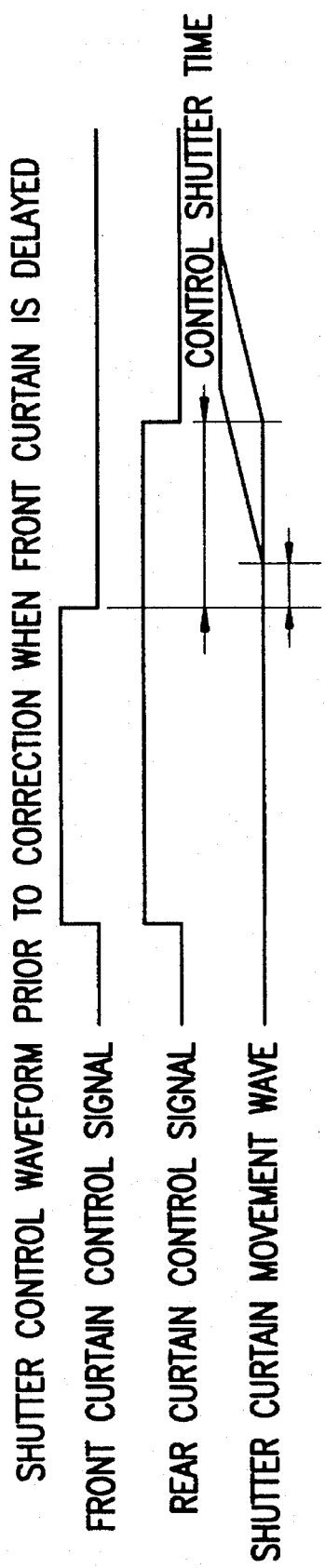
FIGS. 3(a)–3(d) are timing charts showing shutter action timing under conditions differing from those in FIGS. 2(a)–(c)
Figure 3B:
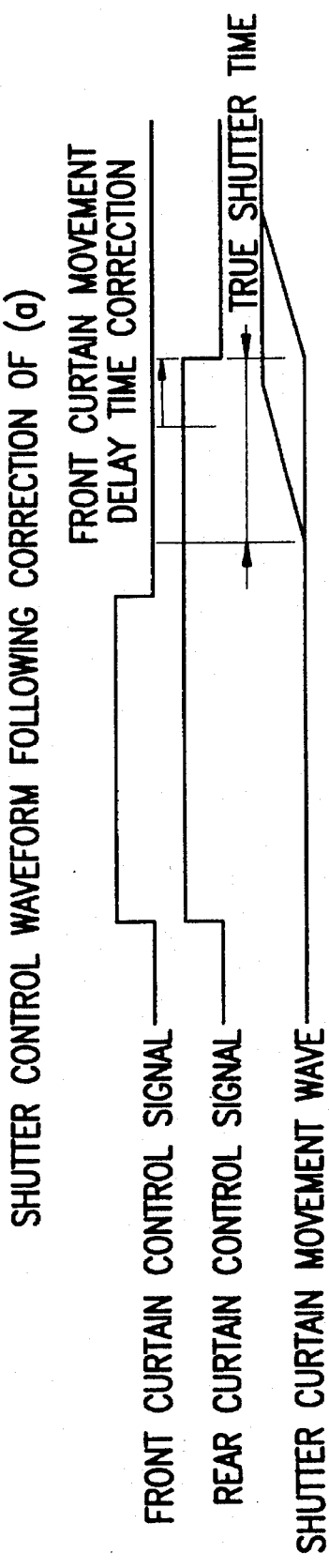

FIG. 3(a) is a control waveform for the case where the front curtain movement is delayed with respect to the front curtain control signal. As shown in FIG. 3(b), adjustment is conducted by delaying the start of movement of the rear curtain by an amount of time equalling the delay time of the front curtain 4. In this manner, the appropriate shutter control time is obtained.

Figure 3C:
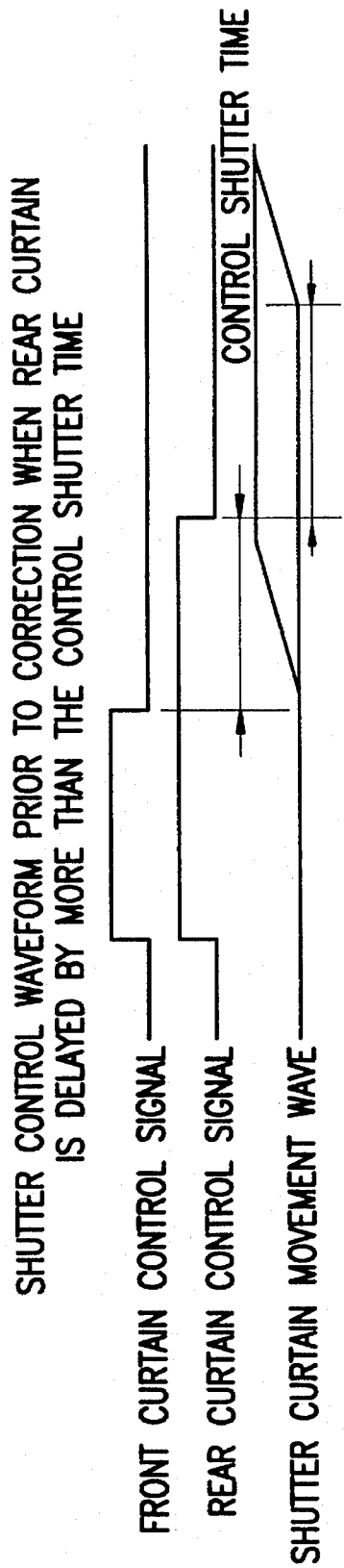

FIG. 3(c) is the waveform for the case where movement of the rear curtain 5 is delayed by a length of time that is at least twice the control shutter time. Such a response may be found in a shutter device having poor precision. In this case, with the conventional shutter control, an effort was made to output an appropriate shutter time by adjusting the driving time of the rear curtain 5 with respect to the front curtain 4. Consequently, driving of the rear curtain 5 could not occur earlier than that of the front curtain 4, and exposure was adversely affected.

Figure 3D:
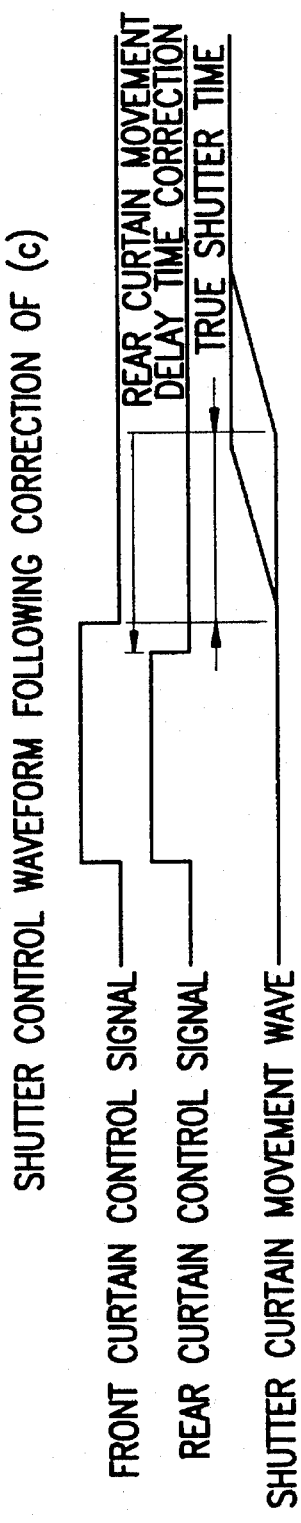

However, with the present invention, the control of the shutter device 3 can be conducted continuously from positive to negative values of the corrected shutter time. Consequently, as shown in FIG. 3(d), it is possible to obtain the appropriate shutter control time by outputting the rear curtain control signal earlier than the front curtain control signal.

Figure 4:
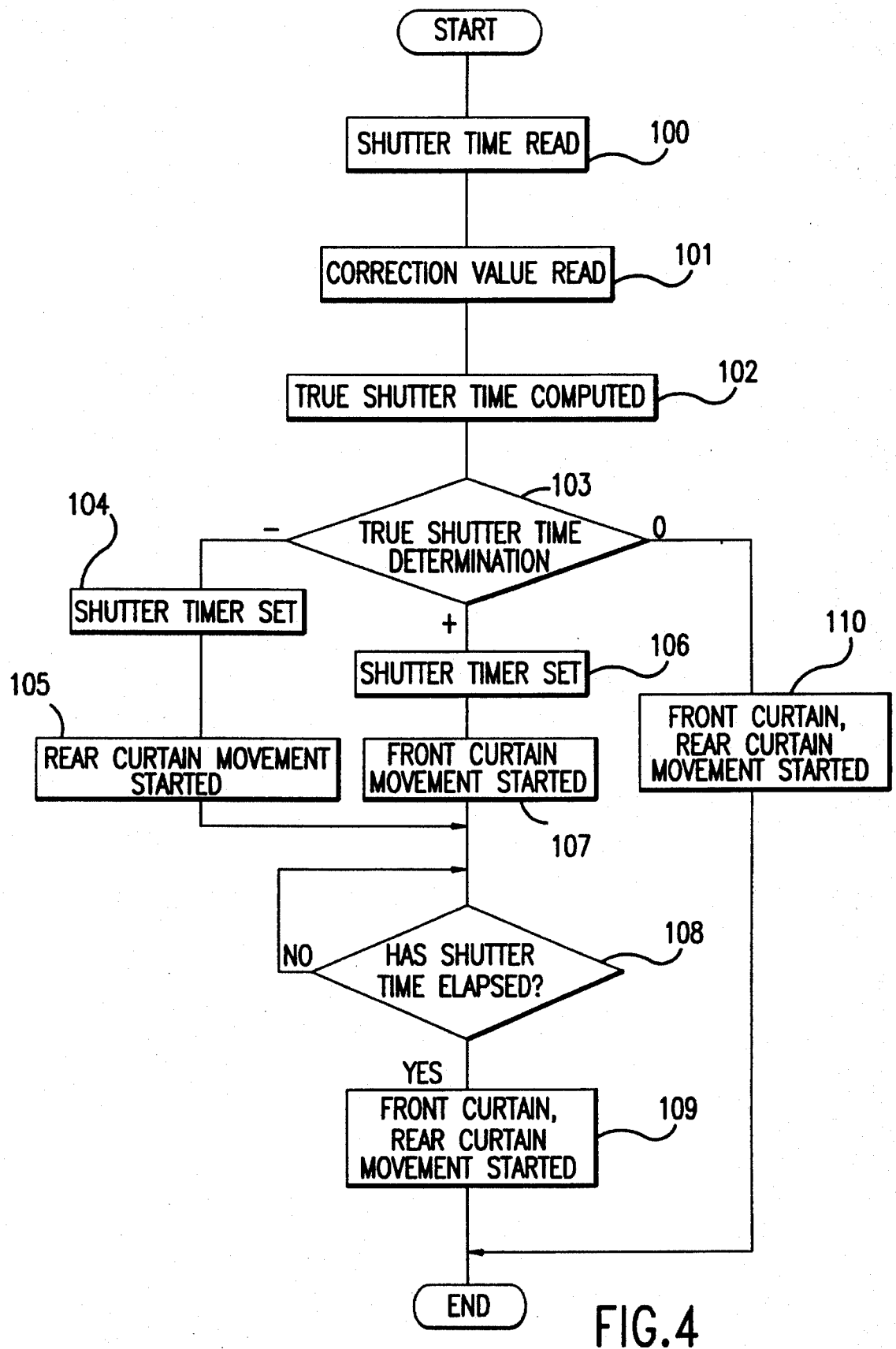
FIG. 4 is a flowchart showing the shutter control in the present invention.

FIG. 4 is a flowchart of an algorithm programmed into the controller 1 for conducting control of the shutter device 3.

Upon the start of the shutter control algorithm, the shutter time is read from the apex computation device 8 in step #100. In step #101, the correction value for the shutter device, which is stored in the memory 2, is read. In step #102, the shutter time used to actually conduct shutter control (ie. the corrected shutter time) is computed on the basis of the values read in steps #100 and #101.

In step #103, the sign of the shutter time computed in step #102 is determined. If the sign is negative, the program moves to step #104, and the corrected shutter time is set on a timer, following which the movement of the rear curtain 5 is started in step #105.

On the other hand, if the determination in step #103 is that the sign is positive, the program moves to step #106, the corrected shutter time is set on a timer, following which the movement of the front curtain 4 is started in step #107.

Next, in step #108, the program waits until the shutter time set in step #104 or #106 has elapsed, and then in step #109, a signal is output to cause one of the front curtain 4 and the rear curtain 5 to move in order to start movement of the shutter curtain that was not moved in either step #105 or step #107.

In addition, if the determination conducted in step #103 is that the corrected shutter time is "0", the front curtain 4 and the rear curtain 5 are driven simultaneously in step #110.

Figure 5A:
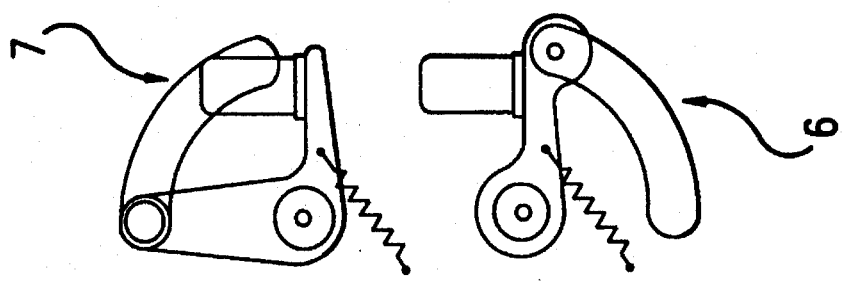
FIGS. 5(a) and 5(b) are schematic drawings showing the state of the shutter curtains prior to the start of a photograph and the drive thereof, respectively.
Figure 5B:
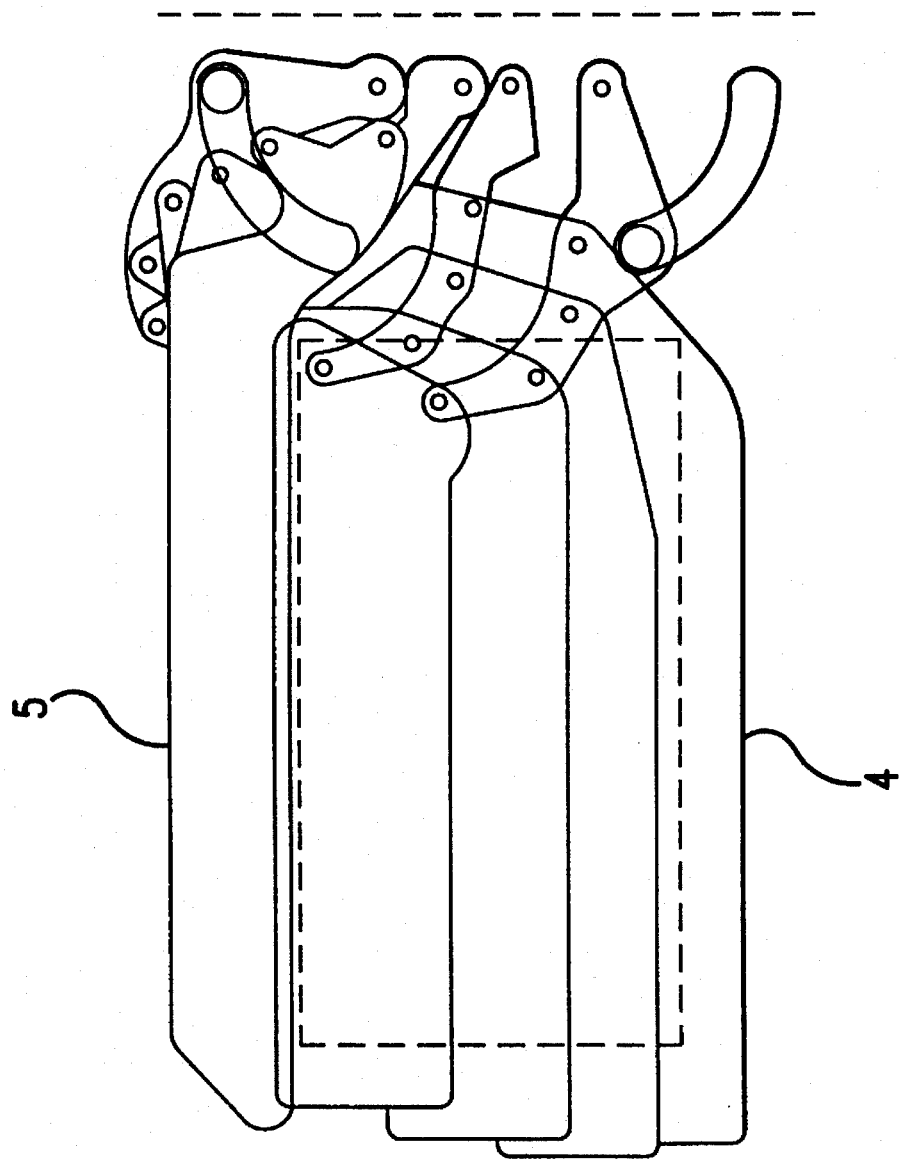
Figure 6B:
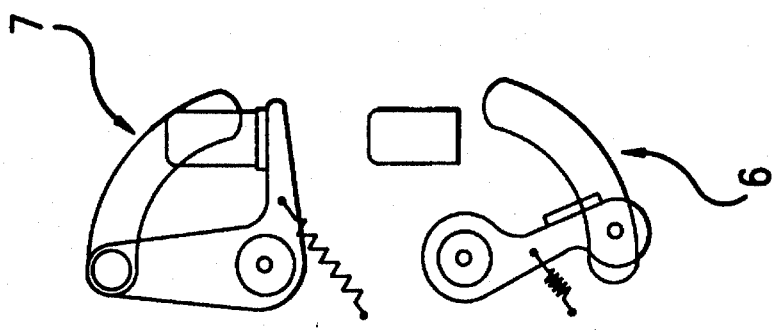
FIGS. 6(a) and 6(b) are schematic drawings showing the state wherein the front curtain of the shutter is moving and the film is being exposed and the drive thereof, respectively.
Figure 6A:
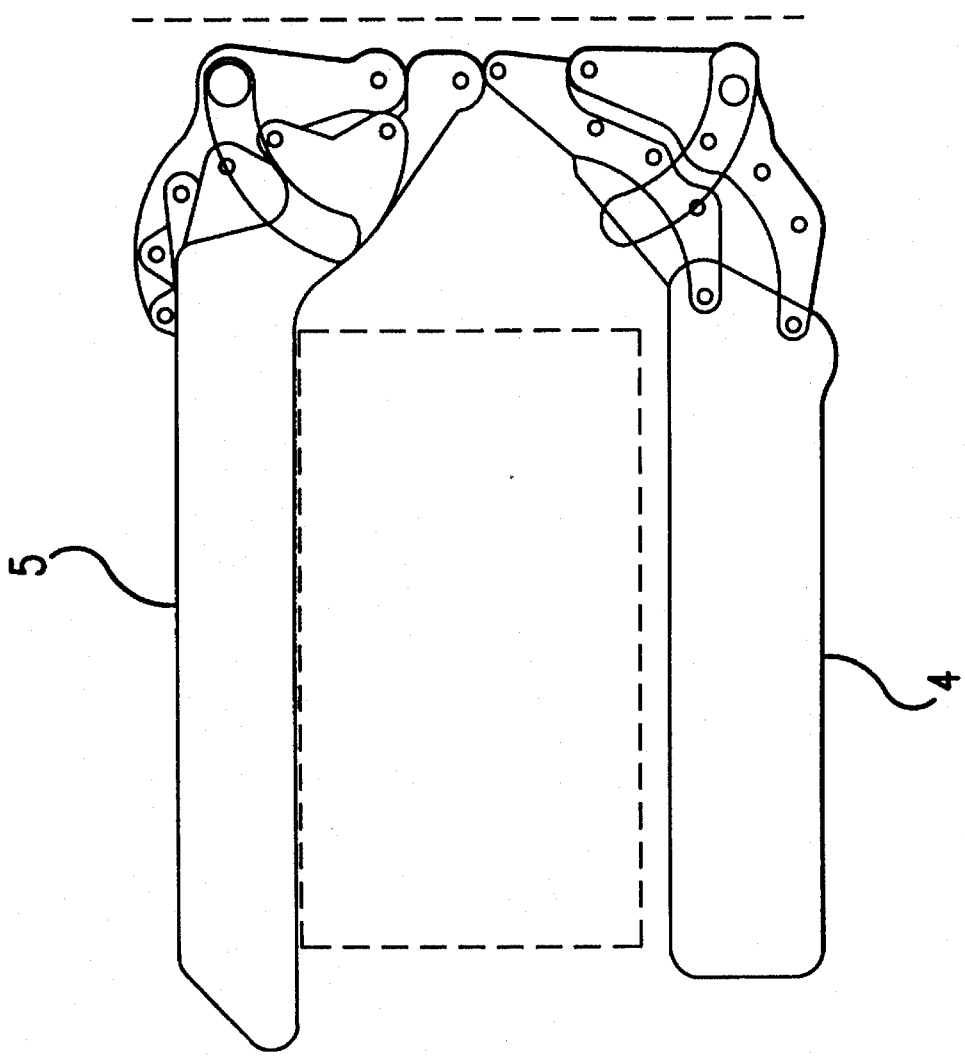
Figure 7B:
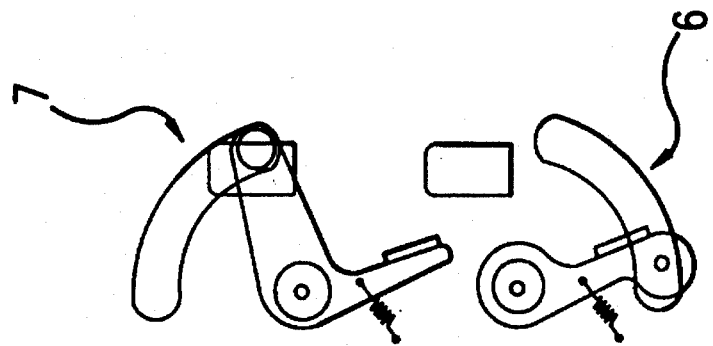
FIGS. 7(a) and 7(b) are schematic drawings showing the state wherein the rear curtain of the shutter is moving and exposure of the film is completed and the drive thereof, respectively.

FIGS. 5(a) through 7(b) show the elements that drive the shutter device 3. FIGS. 5(a), 6(a), and 7(a) show the front curtain 4 and the rear curtain 5. FIGS. 5(b), 6(b), and 7(b) each show the front and rear curtain drives.

Figure 7A:
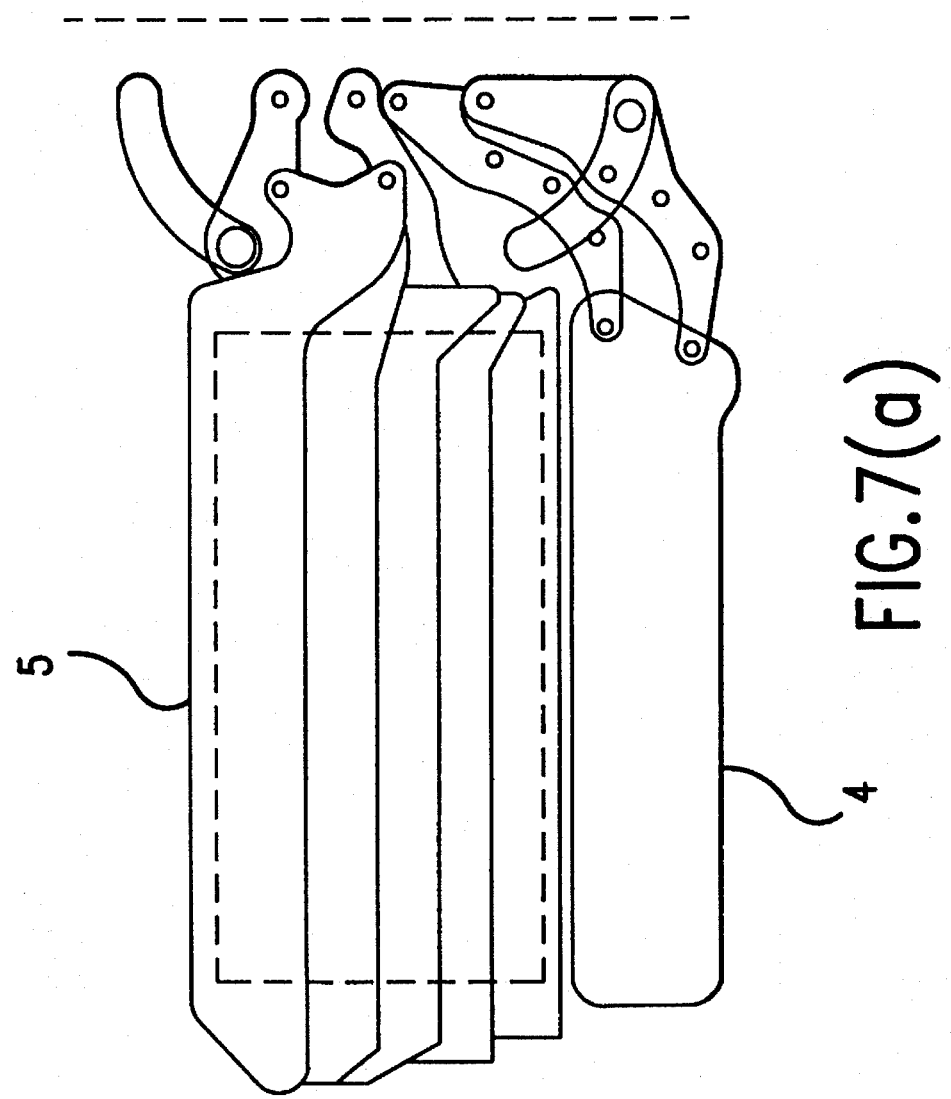

FIG. 5(a) shows the state of the shutter curtains prior to the start of movement thereof. The front curtain 4 and the rear curtain 5 are engagingly stopped by the respective front curtain drive 6 and the rear curtain drive 7. FIG. 6(a) shows the state where the engagement stop of the front curtain 4 is released by the front curtain drive 6 so that the front curtain 4 moves and the shutter is opened. FIG. 7(a) shows the state where the engagement stop of the rear curtain 5 is released by the rear curtain drive 7 so that the rear curtain moves and the shutter is closed.

Such shutter curtain movement is well-known, so a detailed description of such is omitted herein.

In the above described shutter control device, the control output of the front curtain 4 and the rear curtain 5 are each connected to timer outputs of one or more timers of the controller 1.

With the shutter control device according to the present invention, the generation of an appropriate shutter time for high shutter speeds is possible even in cameras having shutter devices with poor precision. Consequently, adverse effects on exposure can be eliminated. In addition, the shutter control time can be freely corrected, and thus, it is possible to construct a camera that can produce a shutter time of, for example, 1/4000 sec. even with a camera equipped with a shutter device 3 that would otherwise produce a shutter time of only 1/2000 sec. Consequently, the cost of cameras can be reduced.

In the illustrated embodiment, the shutter controller implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIG. 4 can be used as the controller. As shown, a distributed processing architecture is preferred for maximum data/signal processing capability and speed.

While this invention has been described in conjunction with specific embodiments thereof, it is evident that many alternatives, modifications and variations will be apparent to those skilled in the art. For example, with the above-described embodiment, an example was shown using the vertical movement type of shutter, as shown in FIGS. 5(a) through 7(b). However, other shutter devices may be used. Accordingly, the preferred embodiments of the invention as set forth herein are intended to be illustrative, not limiting. Various changes may be made without departing from the scope of the invention as defined in the following claims.

What is claimed is:

1. A camera shutter control device, comprising:

shutter means for exposing film within a camera, the shutter means including first and second curtains;

shutter driving means for driving the shutter means;

determining means for determining a shutter time;

memory means for storing in memory at least one correction value; and control means for controlling the camera, the control means including correction means for correcting the shutter time determined by the determining means based on the correction value stored in the memory means, wherein the control means controls the operation of the shutter driving means based on the shutter time corrected by the correction means, the control means conducting a first control operation of the shutter driving means when the corrected shutter time has a positive value that includes moving the first curtain prior to moving the second curtain, and a second control operation different from the first control operation when the corrected shutter time has a negative value that includes moving the second curtain prior to moving the first curtain.

2. The device according to claim 1, wherein the shutter means comprises first and second curtains, and the control means includes at least one timer having outputs connected to the shutter driving means for outputting signals for controlling the first and second curtains.

3. The device according to claim 1, wherein the determining means computes the shutter time.

4. The device according to claim 1, further comprising:

timing means for measuring a period of time corresponding to the corrected shutter time; and moving means for moving, upon the elapse of the period of time measured by the timing means, the second curtain if the first control operation is conducted and the first curtain if the second control operation is conducted.

5. The device according to claim 1, wherein the control means conducts a third control operation of the shutter driving means when the corrected shutter time has a value of zero.

6. The device according to claim 5, wherein the shutter means comprises first and second curtains and the third control operation conducts simultaneous movement of the first and second curtains.

7. A camera shutter control device, comprising:

a shutter device which exposes film within a camera, the shutter device including first and second curtains;

a shutter drive connected to the shutter device;

a determination device which determines a shutter time for the shutter device;

a memory which stores at least one correction value; and a controller including a correction device that corrects the shutter time determined by the determination device based on the correction value stored in the memory, wherein the controller controls the operation of the shutter drive based on the shutter time corrected by the correction device, the controller conducts a first control operation of the shutter drive when the corrected shutter time has a positive value that includes moving the first curtain prior to moving the second curtain, and a second control operation different from the first control operation when the corrected shutter time has a negative value that includes moving the second curtain prior to moving the first curtain.

8. The device according to claim 7, wherein the shutter device comprises first and second curtains, and the controller includes at least one timer having first and second curtain control signal outputs connected to the shutter drive.

9. The device according to claim 7, wherein the determination device computes the shutter time.

10. The device according to claim 7, further comprising:

a timer that measures a period of time corresponding to the corrected shutter time; and a moving device that moves, upon the elapse of the period of time measured by the timer, the second curtain if the first control operation is conducted and the first curtain if the second control operation is conducted.

11. The device according to claim 7, wherein the controller conducts a third control operation of the shutter drive when the corrected shutter time has a value of zero.

12. The device according to claim 11, wherein the shutter device comprises first and second curtains and the third control operation conducts simultaneous movement of the first and second curtains.

13. A method for controlling a camera, comprising:

driving a shutter device, the shutter device including first and second curtains;

determining a shutter time for the shutter device;

storing in memory at least one correction value; and controlling a camera including the steps of:

correcting the determined shutter time based on the stored correction value, controlling the driving of the shutter device based on the corrected shutter time, and conducting a first shutter drive control operation when the corrected shutter time has a positive value that includes moving the first curtain prior to moving the second curtain, and a second shutter drive control operation different from the first control operation when the corrected shutter time has a negative value that includes moving the second curtain prior to moving the first curtain.

14. The method according to claim 13, wherein the shutter device includes first and second curtains, and the control step includes outputting signals from at least one timer to control driving of the first and second curtains.

15. The method according to claim 13, wherein the step of determining a shutter time includes computing the shutter time.

16. The method according to claim 13, further comprising:

measuring a period of time corresponding to the corrected shutter time; and moving, upon the elapse of the measured period of time, the second curtain if the first control operation is conducted and the first curtain if the second control operation is conducted.

17. The method according to claim 13, further comprising the step of conducting a third control operation of the shutter drive when the corrected shutter time has a value of zero.

18. The method according to claim 17, wherein the shutter device comprises first and second curtains and the third control operation includes simultaneously moving the first and second curtains.

* * * * *